May 15, 1934.  K. A. WEBER  1,958,526
GLASS EDGE WORKING MACHINE
Original Filed March 6, 1933   5 Sheets-Sheet 1
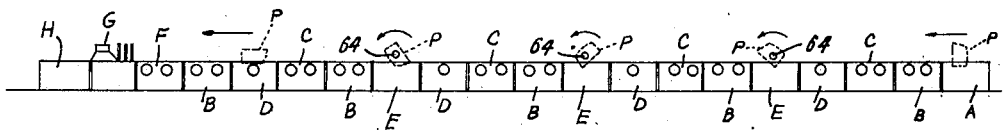
Fig. 1.
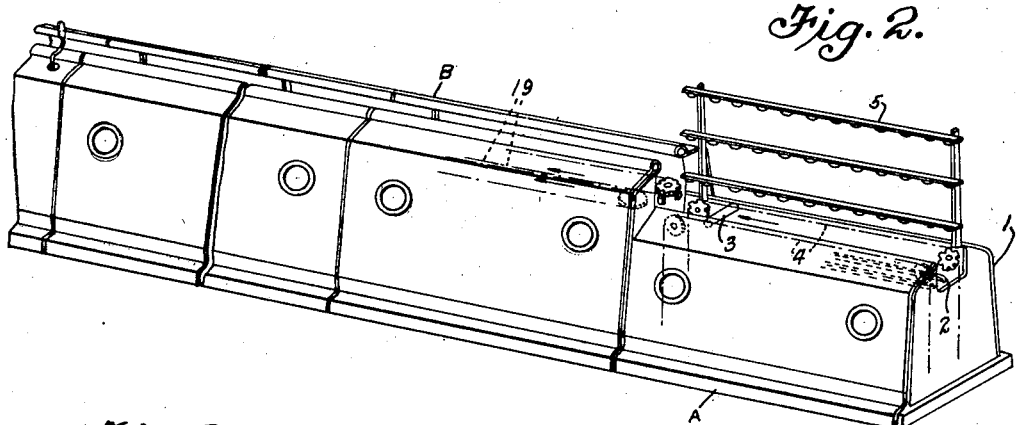
Fig. 2.
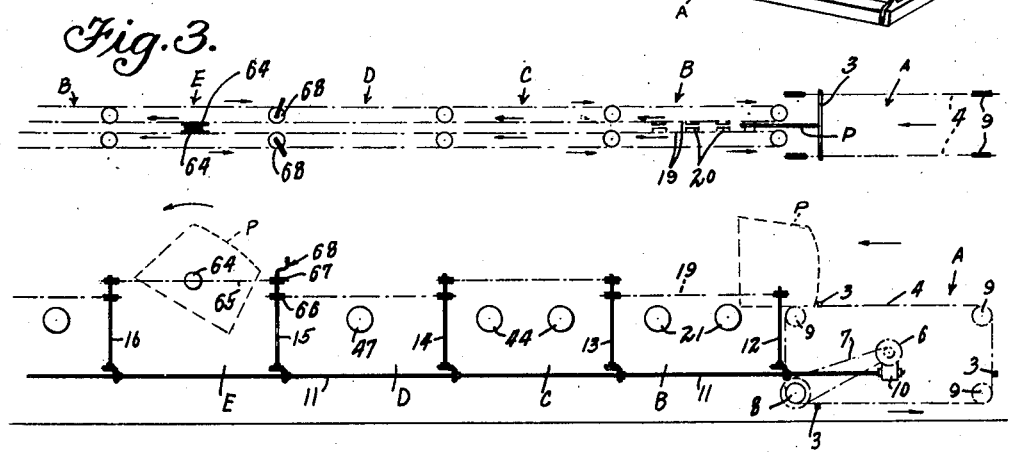
Fig. 3.
Fig. 4.
Inventor
Karl A. Weber
By Lyon & Lyon
Attorneys May 15, 1934. K. A. WEBER 1,958,526
GLASS EDGE WORKING MACHINE
Original Filed March 6, 1933 5 Sheets-Sheet 2

Inventor
Karl A. Weber
By Lyon & Lyon
Attorneys

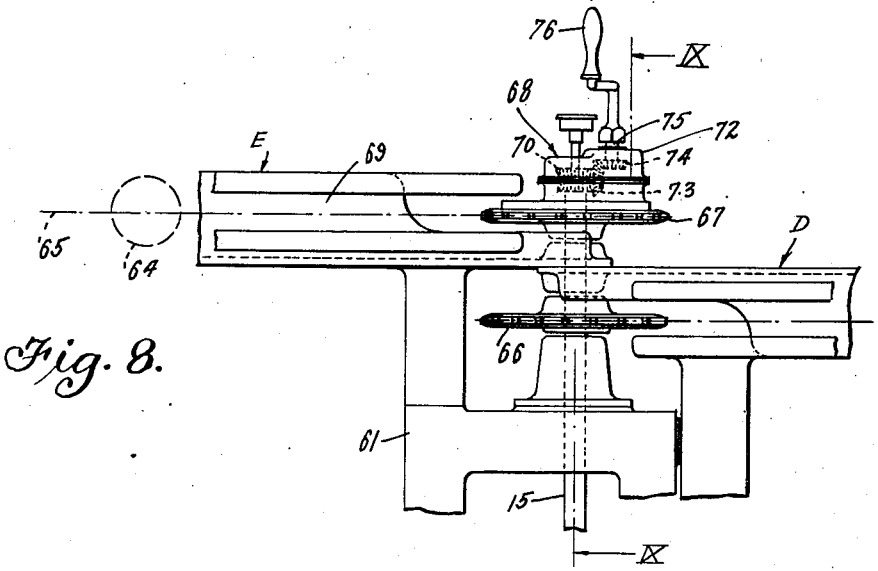

Patented May 15, 1934

1,958,526

UNITED STATES PATENT OFFICE 1,958,526

GLASS EDGE WORKING MACHINE

Karl A. Weber, Los Angeles, Calif.

Application March 6, 1933, Serial No. 659,638
Renewed December 11, 1933

11 Claims. (Cl. 51—76)

This invention relates to glass or similar plate turning apparatus and more particularly to an apparatus for the treating of plates of glass or similar materials of fragile nature to true and grind and seal and clean the edges of the glass so that the glass or other plate material as fed into the apparatus has all of its edges treated as desired before delivery from the apparatus.

In my co-pending application on automatic plate turning machine, Serial No. 587,000, I have disclosed one form of apparatus for automatically turning plates of glass so as to enable the edges thereof to be treated or ground or polished as desired. This application is addressed to an improvement over that disclosed in my said co-pending application.

An object of my invention is to provide an improved form of plate turning device which operates in timed relation with apparatus utilized for the treatment of the edges of the plates of material.

Another object of my invention is to provide an improved form of plate turning device operating in timed relation with apparatus for the treatment of laminated sheets of glass and in which apparatus laminated sheets of glass are trued at their edges and sealed automatically as they progress through the machine.

Another object of my invention is to provide an improved form of apparatus for treating the edges of plates of material such as glass including an improved form of plate conveying apparatus and means interposed between the said improved conveyors and operating in timed relation therewith and of adjustable construction so as to enable the plates of glass as they are conveyed by the said conveying means to be properly positioned in the conveyors as they are rotated to present additional or further edges to the treating apparatus.

Other objects and advantages of this invention it is believed will be apparent from the following detailed description of a preferred embodiment thereof as illustrated in the accompanying drawings.

In the drawings:

Figure 1 is a diagrammatic view of a glass treating apparatus embodying my invention.

Figure 2 is a perspective view of the feed end of apparatus embodying my invention.

Figure 3 is a diagrammatic plan view of the power or conveyor hook-up embodied in my invention.

Figure 4 is a side elevation of the apparatus as diagrammatically illustrated in Figure 3.

Figure 8 is a fragmental elevation of the adjustable driving means provided in the plate-turning apparatus embodied in my invention.

Figure 9 is a sectional end view taken substantially on the line 9—9 of Figure 8.

Figure 5:
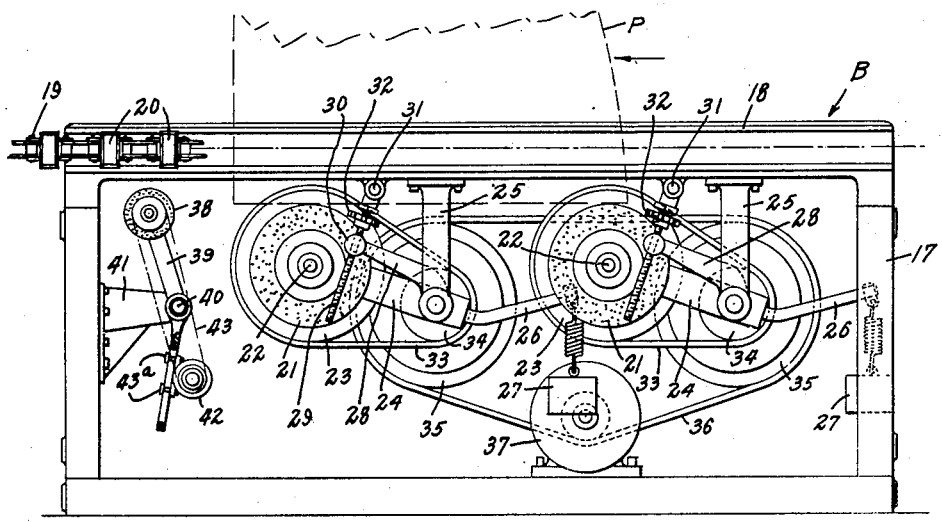
Figure 5 is a side elevation of a grinding unit embodied in my invention.
Figure 6:
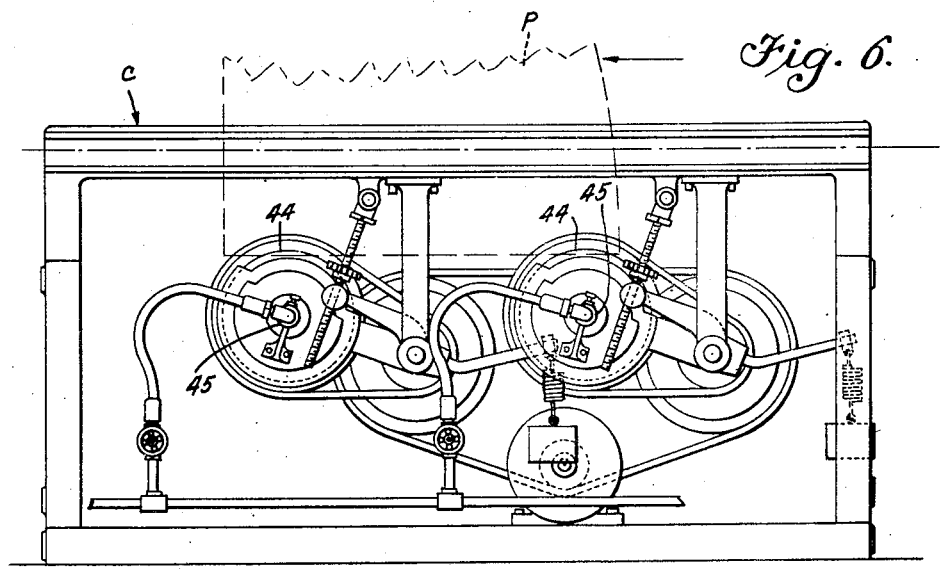
Figure 6 is a side elevation of the cut-out or cleaning unit embodied in my invention.
Figure 7:
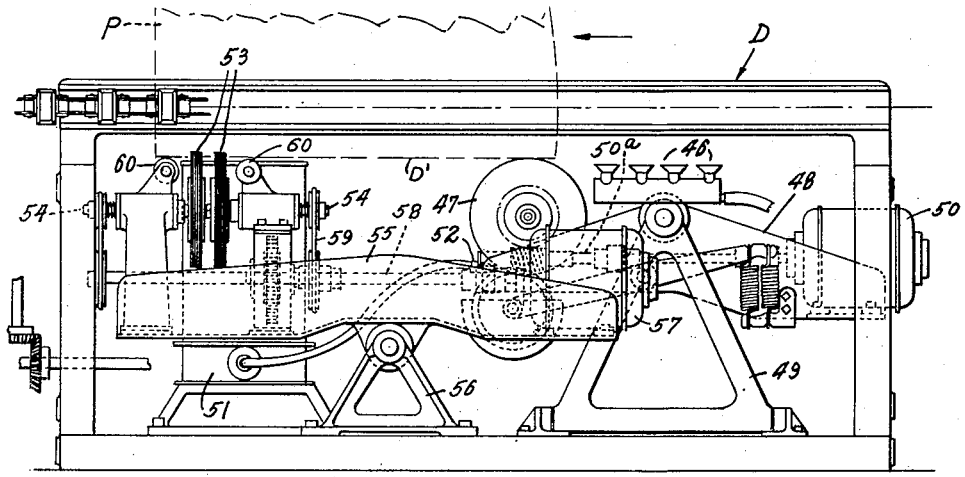
Figure 7 is a side elevation of the sealing unit embodied in my invention.
Figure 11:
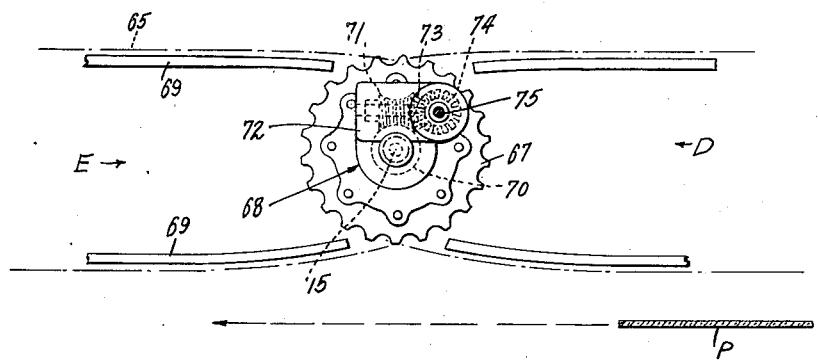
Figure 11 is a top plan view of the apparatus as illustrated in Figure 8.
Figure 10:
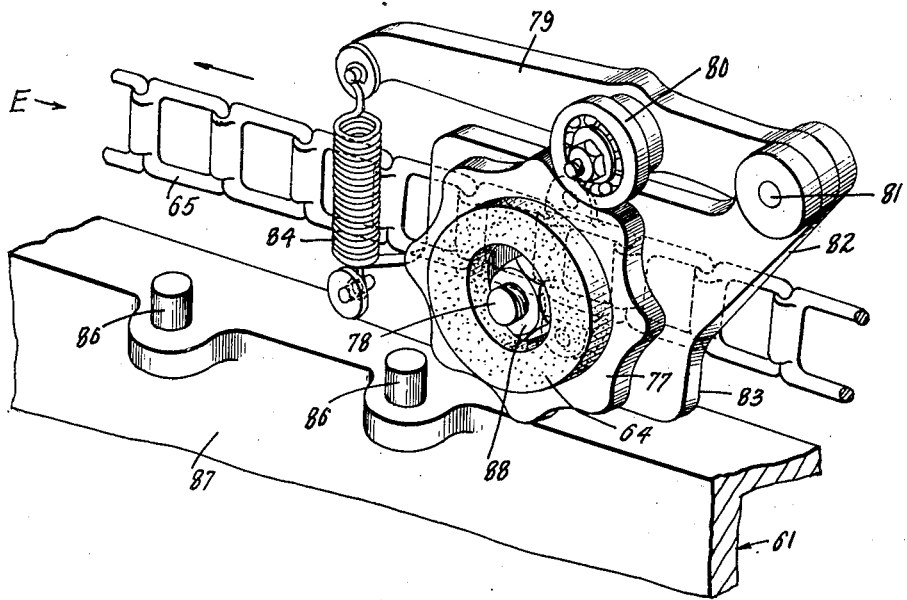
Figure 10 is a fragmental perspective view of a portion of the plate turning apparatus embodied in my invention.
Figure 12:
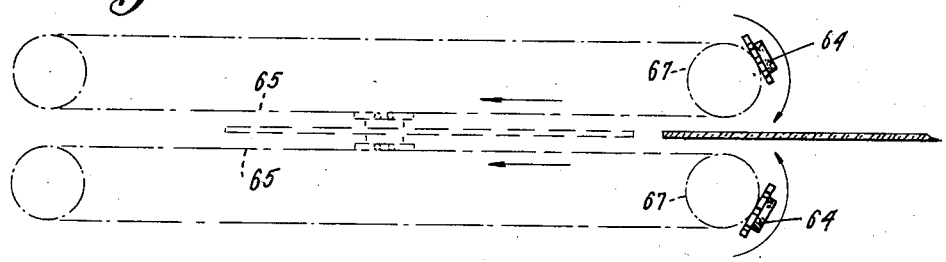
Figure 12 is a diagrammatic view of the plate turning and gripping apparatus embodied in my invention.

In the preferred embodiment of my invention as illustrated in the accompanying drawings there is disclosed a plurality of units including a loading unit A, grinding units B, cut-out units C, sealing units D, turning units E, a polishing unit F, washing unit G, and an inspection or delivery stand H.

The plate of glass P, the edges of which are to be treated, is delivered and set in the loading unit A with one edge downward where it is first ground in the grinding unit B and then treated in the cut-out unit C to remove a portion of the laminations between the spaced plates of glass; the glass is then sealed at its edge D' and then reaches the first turning unit E where its second edge is turned into position to pass through the same sequence of operations. The glass is then turned again by another turning unit E to present an additional edge to the units B, C and D. After treatment of this edge, the glass is again turned by a turning unit E where the final edge, which may be the exposed edge of the plate of glass, is treated in a series of units B, C, and D, then on a finishing grinding unit B, polishing unit F, the plate of glass is then washed in the washing unit G and delivered to the inspection or delivery stand.

The entire operation of treating the four edges of the plates of glass, truing the edges, and polishing or finishing the edges which it is desired be polished and finished, is performed automatically through the sequence of units arranged in the desired manner, depending upon the particular operation and which edge or edges it is desired be polished and finished as is the last edge in the above described operation, The units making up the plate treating apparatus embodying my invention may be of any suitable or desirable construction, but I prefer to form the unit A or the loading unit so that it includes generally a frame 1 having a base guideway 2 over which pusher blocks 3 mounted between spaced conveyors 4 are caused to move. The pusher blocks 3 engage the rear edge of the glass as it is stood in position on the base runway 2 and supported on the side support 5 to cause the plates of glass to be fed into the apparatus embodying my invention in a definite timed or spaced relation to which timing of the operation of the subsequent units of my invention is related. The spaced conveyors 4 are driven from any suitable source of power such, for example, as electric motor 6 which drives by means of a chain 7 and a pulley 8 secured to one of the shafts of the conveyor chains 4. The conveyor chains 4 are trained over sprockets 9 within the frame 1 of the unit.

The motor 6 drives through a reduction unit 10, countershaft 11, from which the drive shafts 12, 13, 14, 15 and 16 of the grinding unit B, cut-out unit C, sealing unit D, and the turning unit E, respectively, are driven. In this manner a definite timed relation is established between each of the units and the loading unit so that a definite timed relationship may be established between the time of delivery of the plate P to the apparatus and the operation of the turning units E.

The grinding units B may be of any suitable or desirable construction and, as illustrated in Figure 5, include a frame 17 dividing guides 18 at its upper end within which vertically disposed conveyors 19 are guided. The conveyors 19 are provided with spaced glass gripping members 20 which grip or engage the surface of the glass mounted between the conveyors to hold the plate of glass P in position so that the edge thereof contacts grinding wheels 21 and 21. The grinding wheels 21 are of any suitable or desirable construction and are mounted upon shafts 22 which are driven by a belt pulley 23. The shafts 22 are supported in bearings at the end of balance arms 24, which balance arms 24 are journaled on shafts or hangers 25 secured to the frame 17.

Weight arms 26 extend rearwardly from balance arms 24 and weights 27 are supported from the rear ends of the weight arms 26 so as to counterbalance the weight of the grinding wheels 21, pulleys 23, and arms 24. Stop arms 28 are secured to balance arm assemblies 24 and a stop rod 29 is slidably passed through the heads 30 of the arms 28. The arms 28 are pivotally mounted upon the frame 17 at pivots 31 and stop nuts 32 are threaded to the stop rods 29 so as to provide an adjustable stop to hold the grinding wheels 21 from raising upwardly more than a predetermined amount under the influence of the weights 27.

The belt pulleys 23 are driven by means of belts 33 from pulleys 34. Mounted on the shafts of the hangers 25 are pulleys 35 which drive the shafts of the hangers 25, and these pulleys are in turn driven by belts 36 from electric motors 37. Thus each grinding unit is, except for the drive of the conveyors 19, a separate and distinct unit which may be installed at any desired position in the assembly of units, and each of the pairs of conveyors for the units are driven separately as in the case of the first grinding unit B from the shaft 12, which are in turn driven from the countershaft 11.

In order to avoid rounding of the corners of the plates of glass an undesirable amount, it is preferable to mount in each grinding unit B and in each polishing unit, an auxiliary grinding wheel 38 which is supported on a balance arm 39, which balance arm 39 is pivotally supported at 40 to a hanger 41 secured to the frame 17. Balance arm 39 extends downwardly from the pivot 40 and a motor 42 is mounted on the downwardly extending portion thereof. The motor 42 drives the grinding wheel 38 by means of a belt connection 43. The motor 42, in order to provide an adjustable counter-balancing of the grinding wheel 38, is adjustably mounted along the length of the downwardly extending portion of the arm 39 by means of bolts 43ª which are passed through slots formed in the downwardly extending portion of this arm.

The auxiliary grinding wheel 38 is of relatively small diameter as compared with the grinding wheels 23 and is mounted so as to normally project above the plane of movement of the edge of the plate of glass being ground so that the corner of the plate of glass contacts with the periphery of the rotating grinding wheel 38 to depress the same and grind the corner of the plate of glass without producing a material gouge in the plate of glass at the corner.

The cut-out units C are similar in construction to the grinding unit B in all respects except for the specific means provided for cutting the laminations from between the plates of glass forming the laminated glass which are driven in the same manner and balanced in the same manner as are the grinding units 21.

The discs 44 of the cut-out units are preferably metal discs of a thickness substantially equal to the width of the lamination between the plates forming the laminated glass plate P and these discs are heated, preferably by means of gas burners 45, the specific construction and operation of which does not form a part of this invention, and it is therefore believed unnecessary to specifically describe this construction.

The plate of glass P as it is fed from the loading unit A is gripped by the conveyors of the grinding unit B in timed relation determined by the drive means heretofore described, and is delivered to the cut-out unit C in further timed relation determined by the conveyor drive means, and upon leaving the cut-out unit C, is delivered to the sealing unit D or the conveyors thereof, in timed relation so that the plate of glass P is gripped and supported by the gripping members of the conveyor of the sealing unit D which is similar in all respects to the conveyor of the grinding unit B. The sealing unit D may be of any suitable or desirable construction and first includes a plurality of air nozzles 46 supplied with air and pressure from any suitable or desirable source for blowing from between the plates of glass P loose particles of the substance forming the lamination, and likewise for cooling the edges of the glass.

The plate of glass, after leaving the air nozzles 46, passes over a sealing disc 47 by means of which a sealing substance is provided between the plates forming the laminated plate P to seal the laminated plate of glass at its edges. The sealing disc 47 is supported by a balance hanger 48 which is pivotally mounted on a standard 49 secured to the frame of the sealing unit, and the weight of the assembly of the sealing unit 47, and the means provided for supplying the sealing substance to the sealing disc 47, is counterbalanced by the motor 50 mounted on the opposite end of the arm 48 and provided with a drive connection 50ª for driving the sealing disc 47. Any suitable or desirable means may be provided for the purpose of providing the sealing substance preferably under pressure to the periphery of the sealing disc 47, which means are diagrammatically illustrated including pressure pump 51 and nozzle 52.

In order to remove sealing substance from the outer surface of the plate of glass P, it passes between wiping members 53 after leaving the sealing disc 47. The wiping members 53 may be of any suitable or desirable substance and is herein illustrated as including fabric brushes which are mounted upon and driven from shafts 54 which are supported in bearings carried by hangers and mounted upon a balance arm 55.

Balance arm 55 is pivotally supported upon a standard 56 secured to the frame. A motor 57 for driving the wipers 53 is supported at the opposite end of this arm 55 to counterbalance the weight of the wiper assembly and the motor 57 drives a shaft 58 which in turn, by means of pulley drive connections 59, drives shafts 54 of the wipers 53. The wiping unit includes supporting rollers 60 which are supported by brackets carried from the bearing hangers of the shafts 54 which rollers 60 engage the edge of the plate of glass P to support the plate of glass P as it is being brushed or wiped by the wipers 53.

The finishing grinding units, polishing units, are similar in all respects to the grinding unit B except for modifications which are obvious to those skilled in the art as to the texture and construction of the glass engaging or grinding or polishing elements therein included.

The turning units embodying my invention are preferably of the following construction:

The turning unit E preferably includes a frame 61 in which, at the ends thereof, there is mounted edge supporting members 62 on which the edges of the plate of glass P are supported on a grooved rubber mat 63 as the plate of glass P is delivered to and removed from the turning unit E.

The support does not extend throughout the unit E but is formed only at the ends of the frame structure. The frame E rotatably supports shafts 15 at one end and in a similar manner supports the shafts 16 at the other end, except that there is provided in connection with the shafts 15 an adjustment means for adjusting the position at which the gripping members 64 of the conveyer 65 grip the surface of the plate of glass P with relation to the amount of the plate of glass which is fed through the turning unit E before the gripping members 64 grip the plate of glass. This distance must be correctly adjusted in order to enable the edge upon which the plate of glass is turned, after the turning has been completed, to rest upon the support 62 at the delivery end of the turning units so that the edge as supported will be in a proper horizontal plane on leaving the turning unit to contact the operating elements of the grinding, cutting out, sealing or polishing units of the remainder of the apparatus.

The conveyor of the last unit succeeding the turning unit is likewise supported by the spaced shafts 15 and in order to accomplish this result, the sprockets 66 for the conveyors of the last unit are journaled upon the shafts 15 in position below the sprockets 67 which drive the conveyor 65 of the turning unit.

The sprockets 67 are journaled on the shafts 15 and are driven by the shafts 15 through adjustable gear connections 68 which enable the adjustment of the timing of the contacting of the gripping members 64 with the surface of the plate of glass P in order that on turning, the plate of glass P may come into a proper position with the new edge in the correct horizontal plane. Once adjusted for a series of plates of glass of the same dimensions, the adjustment 68 need not be disturbed and the feed through the entire apparatus for treating all of the edges of the plates of glass P desired is automatic and the operation of the different units are so timed as to make this operation possible.

The turning unit and conveyors are guided in guideways 69 formed in the frame 61 on opposite sides of the plate of glass P. The adjustable gear connection 68 includes a worm pinion 70 which is keyed to the shafts 15 and meshes with a worm 71 supported in a housing 72 formed integral with the sprockets 67. In order to rotate the worm pinion 70, a bevel pinion 73 is secured to the worm shaft in position to mesh with a bevel gear 74 secured to the end of the shaft 75 of an adjustment crank 76. The shaft 75 is journaled in bearing means provided in the upper portion of the cover of a housing 72.

By rotating the crank 76 the entire sprocket assembly will be rotated around the shaft 15 as desired until the gripping members 64 are positioned in correct position. Due to the worm pinion and worm connection, the driving of the shaft 15 will not reverse this adjustment but the entire pinion 70 and adjustment means will rotate with the sprockets 67 when the shaft 15 is driven. The adjustment means provided for the two opposed conveyors is the same so that it is deemed unnecessary to describe both of these structures.

With the gripping members 64 positioned properly to engage the plate of glass P at the proper point, the plate of glass P is rotated by a form of star and Geneva movement including a star wheel 77 which is secured to the gripping members 64 and is rotatably supported on a pin 78 secured to the conveyor 65. In order to hold the star wheel 77 from rotating except when caused to rotate by means as will hereinafter be described, a friction brake means is provided including a brake lever 79 upon which a brake roller 80 is rotatably supported to engage the periphery of the star wheel 77. The brake arm 79 is pivotally supported at a pin 81 on a bracket arm 82 formed integral with the carrying and guide plate 83 of the conveyor 65.

At its opposite end brake arm 79 is connected with a spring 84, which spring 84 is at its other end connected to an extension of the base and guide plate 83 of the conveyor 65. As the glass progresses through the turning unit, the star wheel 77 engages the Geneva pins 86 secured to the guide member 87 of the frame 61 and as the conveyor continues to move the plate of glass and the star wheel 77 forward, the engagement between the star wheel 77 and the pins 86 causes the plate of glass to be rotated through the desired number of degrees depending upon the contour of the star wheel 77 and the location of the pins 86. If the plate is a rectangular plate, this engagement causes a rotation of 90 degrees. If the plate is of shape other than rectangular, the positioning of the pins 86 in the formation of the star wheel 77 may be made such as to rotate the plate through the number of degrees desired to bring the new edge into the required horizontal plane. By simple removal of the holding nut 88 and changing the star wheel 77, repositioning the pins 86 the turning device may thus be made to accommodate any shape plate of glass. The plate of glass thus being located has its new edge again seated in a grooved mat similar to the grooved mat 63 mounted at the exit end of the frame 61 of the turning unit in a proper horizontal plane to be engaged by the elements of the subsequent treating units.

Having fully described my invention, it is to be understood that I do not wish to be limited to the details herein set forth, but my invention is of the full scope of the appended claims.

I claim:

1. In a machine for truing the edges of glass plates, means for supporting and conveying plates of glass with the edge to be treated in substantially horizontal position, means interposed between the edge treating means adapted to grip the surface of the glass in timed relation with the feed of the glass to said means, and means for actuating the latter said means to rotate the plates of glass to bring a new edge of the plate of glass automatically into substantially the same horizontal plane.

2. In a machine for treating the edges of glass plates, a line of support on which a glass plate may be supported on edge in substantially vertical position, means for actuating the latter said means to move the plate along the line of support, means for grinding the lower edge of said plate during the movement thereof, means for gripping the plate from the sides thereof, means for actuating the gripping means coordinated with the plate moving means to rotate the same automatically to position another edge thereof with relation to a succeeding grinding means.

3. A machine for grinding edges of a glass plate including a plurality of grinding means, means for presenting an edge of the plate into grinding relation thereto, coordinated means connected therewith automatically operable in timed relation to grip the surface of the plate of glass as it is moved by one of said grinding means to turn and position another edge thereof with relation to a succeeding grinding means.

4. A machine for grinding edges of a glass plate including a plurality of grinding means, means for presenting an edge of the plate into grinding relation thereto, coordinated means connected therewith automatically operable in timed relation to grip the surface of the plate of glass as it is moved by one of said grinding means to turn and position another edge thereof with relation to a succeeding grinding means, and means operable for adjusting the said surface gripping means so as to regulate the point of gripping means of the surface of the glass with relation to the new edge to be positioned with relation to the second grinding means.

5. A machine for treating the edges of glass plates including a pair of spaced conveyors having gripping means for gripping the surface of the plates of glass, means for driving the conveyor means, means for grinding the lower edge of the plate of glass so positioned and held, and automatically operable mechanism adapted to grip the surface of the plates of glass subsequent to the grinding operation at a predetermined distance from the advancing edge of the plate of glass to turn the plate of glass so that the advancing edge thereof may be ground.

6. In a glass edge treating apparatus the combination of a plurality of glass treating units of groups provided to treat the edges of plates of glass, means for gripping the surface of the plates of glass as they are moved through the treating units to automatically successively and in timed relation deliver the succeeding edges of the plate of glass into position to be operated upon by said units.

7. In an apparatus of the class described, the combination of a loading unit, a plurality of edge treating units and a plate turning unit, means for driving each of said units so that a timed relation is maintained between the loading, treating and turning units.

8. In an apparatus of the class described, the combination of a loading unit, a plurality of edge treating units and a plate turning unit, means for driving each of said units so that a timed relation is maintained between the loading, treating and turning units, and means for adjusting the driving means for the turning unit with relation to an edge other than the edge treated by said treating units.

9. In a glass edge treating apparatus, a grinding unit including a frame, a plurality of glass grinding elements mounted within the frame, means for supporting and conveying a plate of glass in substantially horizontal position in grinding relation with said grinding means and over said grinding means, and means mounted at the delivery end of said grinding unit and operable to receive and support the ends of a plate of glass so as to maintain substantially the correct angle at the corners of the plate of glass.

10. In an automatic glass edge treating apparatus, the combination of a frame, a pair of horizontally moving conveyor elements guidingly supported by the frame, gripping means for gripping the surface of the glass carried by said conveying means, means for driving the conveying means, and means for adjusting the driving means to determine the point along the surface of the glass at which the gripping means will grip the surface of the glass with relation to an edge of the plate of glass.

11 In a machine for truing the edges of glass plates, means for supporting and conveying the plates of glass, means interposed between the edge treating means adapted to grip the surface of the glass in timed relation with the feed of the glass to said means, and means for actuating the latter said means to rotate the plates of glass to bring a new edge of the plate of glass automatically into the plane of the edge of glass being previously treated.

KARL A. WEBER.